Patented June 2, 1931

1,808,637

UNITED STATES PATENT OFFICE

GEORGE AUGUSTUS COLBERG, JOHN DANIEL HARRISON, AND JOSEPH WINTERBERGER, OF YALE, MICHIGAN

RADIATOR CEMENT

No Drawing.    Application filed February 12, 1929.   Serial No. 339,486.

Our invention relates to cementing compounds and particularly to a cement for use in repairing leaks in automobile radiators, cracked cylinders, water jackets and the like.

An object of the invention is to provide a cementing compound which will be effective in stopping leaks in liquid containers and which is inexpensive to make and may be easily applied.

A further object of the invention is to provide a cementing compound particularly adapted for use on automobile radiators which will not clog the circulation of the radiator system.

A still further object is to provide a cementing compound which will not injure metal or rubber connections in the radiator and which may be used with alcohol or other anti-freeze solutions.

Our compound is composed of the following ingredients:

Special fibre starch, plaster of Paris, yellow ochre, red pepper, ground pulp wood and Venetian red, powdered rosin, denatured alcohol, gelatine glue, to which is added a suitable quantity of water.

In preparing the compound we preferably use the following formula, using substantially the proportions given: 1 pound of fibre starch, 3 ounces of plaster of Paris, 3 ounces of yellow ochre, 1 ounce of red pepper, 4 ounces of ground pulp wood, and 1 ounce of Venetian red. These materials are thoroughly mixed in a dry state and to them is added about 78 ounces of water. The whole is then again thoroughly mixed. About 3 ounces of powdered rosin is dissolved in about 1 pint of denatured alcohol and added to the above mixture, stirring the whole thoroughly until well mixed. About 2 ounces of gelatine glue is then dissolved in 12 ounces of warm water and added to the mixture and thoroughly stirred up. The compound is then put up and is ready for use.

While the proportions given above have resulted in an excellent cementing compound, yet de do not limit ourselves to them as they may be varied and still result in a good compound. Furthermore while we preferably have our cement compounded from all the elements listed above, we may leave out one or more under certain circumstances, and still have a cementing compound which will be suitable for many purposes.

When using the compound to repair leaks in radiators of automobiles about 9 ounces of our cementing compound are put in the radiator and the radiator is then filled with water or an anti-free mixture of any kind, and then the motor is run until the whole mixture comes to a boil. When the water comes to a boil the anti-leak mixture turns into a cement which as it goes out through the leak in the radiator strikes the air, hardens and forms a hard core which hermetically seals the holes through which it has leaked. The mixture goes through the entire cooling system of the car and will seal up cracked water jackets as well as leaks in the radiator. The solution may be used in old radiators that are badly rusted and where a rust spot is so far along that the air is coming through to any extent the solution will form on the outside and form a hard coating which will arrest further rusting process and prevent the radiator from leaking at that point.

It will be obvious to those skilled in the art that various changes may be made in our device without departing from the spirit of the invention, and we, therefore, do not limit ourselves to what is described in the specification, but only as set forth in the appended claims.

Having thus fully described our said invention, what we claim as new and desire to secure by Letters Patent, is:—

1. A cementing compound comprising fibre starch, plaster of Paris, yellow ochre, red pepper, ground pulp wood, Venetian red, powdered rosin, denatured alcohol and gelatine glue, the whole being mixed and added to sufficient quantity of water to form a liquid solution, substantially as set forth.

2. A cementing compound comprising a solution of fibre starch, plaster of Paris, yellow ochre, red pepper, ground pulp wood, Venetian red, rosin, alcohol, and gelatine glue, substantially as set forth.

3. A cementing compound comprising a mixture of substantially one pound fibre starch, three ounces plaster of Paris, three ounces yellow ochre, one ounce red pepper, four ounces ground pulp wood, one ounce Venetian red, seventy eight ounces of water, three ounces powdered rosin, one pint denatured alcohol, and two ounces of gelatine glue dissolved in twelve ounces of water, substantially as set forth.

In witness whereof, we have hereunto set our hands at Yale, Michigan, this fifth day of February, A. D. nineteen hundred and twenty-nine.

JOSEPH WINTERBERGER.
GEORGE AUGUSTUS COLBERG.
JOHN DANIEL HARRISON.